(12) United States Patent
Bae et al.

(10) Patent No.: US 8,362,879 B2
(45) Date of Patent: Jan. 29, 2013

(54) APPARATUS AND METHOD FOR INTEGRATED READER AND TAG

(75) Inventors: Ji-Hoon Bae, Daejon (KR); Chan-Won Park, Daejon (KR); Dong-Han Lee, Daejon (KR); Hee-Sook Mo, Daejon (KR); Gil-Young Choi, Daejon (KR); Cheol-Sig Pyo, Daejon (KR); Jong-Suk Chae, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 698 days.

(21) Appl. No.: 12/375,137

(22) PCT Filed: Jul. 26, 2007

(86) PCT No.: PCT/KR2007/003601
§ 371 (c)(1),
(2), (4) Date: Jan. 26, 2009

(87) PCT Pub. No.: WO2008/013418
PCT Pub. Date: Jan. 31, 2008

(65) Prior Publication Data
US 2010/0001843 A1 Jan. 7, 2010

(30) Foreign Application Priority Data

Jul. 26, 2006 (KR) .................. 10-2006-0070417
Jul. 25, 2007 (KR) .................. 10-2007-0074680

(51) Int. Cl.
*H04Q 5/22* (2006.01)
*H04L 12/413* (2006.01)
*G08B 13/14* (2006.01)

(52) U.S. Cl. .................. 340/10.2; 340/10.3; 340/10.32; 340/572.1; 370/447; 370/448; 370/461; 370/462

(58) Field of Classification Search .................. 340/10.2, 340/10.3, 10.32, 572.1; 370/447, 448, 461, 370/462
See application file for complete search history.

(56) References Cited

U.S. PATENT DOCUMENTS 5,774,876 A * 6/1998 Woolley et al. .................. 705/28
(Continued)

FOREIGN PATENT DOCUMENTS

CN 2743899 11/2005
EP 1 564 679 8/2005
(Continued)

OTHER PUBLICATIONS

Notice of Allowance issued in corresponding Korean Application No. 10-2007-0074680 on Jul. 23, 2009.
(Continued)

*Primary Examiner* — Jennifer Mehmood
*Assistant Examiner* — Andrew Bee
(74) *Attorney, Agent, or Firm* — Staas & Halsey LLP

(57) ABSTRACT

Provided are a reader-tag integrated RFID apparatus and a method for controlling the same. The apparatus includes a tag unit for communicating with an external reader, and transmitting a response signal and data corresponding to a signal transmitted from the external reader to the external reader, a reader unit for selecting a channel between other reader and the reader-tag integrated RFID apparatus with a different delay time, and communicating with an external tag using a random value to minimize collision; and a controller for selectively activating one of the tag unit and the reader unit if it necessary.

31 Claims, 8 Drawing Sheets

U.S. PATENT DOCUMENTS

| | | |
|---|---|---|
| 6,531,957 B1 | 3/2003 | Nysen |
| 6,633,226 B1 * | 10/2003 | Nysen ......................... 340/10.1 |
| 2003/0137403 A1 * | 7/2003 | Carrender et al. ........... 340/10.4 |
| 2003/0151489 A1 | 8/2003 | Shbiro et al. |
| 2003/0179778 A1 * | 9/2003 | Guanter et al. ............... 370/503 |
| 2004/0176032 A1 * | 9/2004 | Kotola et al. ................ 455/41.2 |
| 2005/0280505 A1 * | 12/2005 | Humes et al. ................ 340/10.1 |
| 2006/0175406 A1 * | 8/2006 | Dressen ........................ 235/451 |
| 2006/0258289 A1 * | 11/2006 | Dua ............................ 455/41.3 |
| 2006/0280149 A1 * | 12/2006 | Kuhl et al. .................... 370/338 |
| 2007/0075838 A1 * | 4/2007 | Powell ......................... 340/10.2 |
| 2007/0126555 A1 * | 6/2007 | Bandy .......................... 340/10.2 |
| 2007/0139162 A1 * | 6/2007 | Bandy et al. ................. 340/10.2 |
| 2007/0229226 A1 * | 10/2007 | Soleimani et al. .......... 340/10.2 |
| 2007/0236350 A1 * | 10/2007 | Nystrom et al. ........... 340/572.1 |

FOREIGN PATENT DOCUMENTS

| | | |
|---|---|---|
| JP | 2002-230675 | 8/2002 |
| JP | 2005-346132 | 12/2005 |
| KR | 10-2005-0006429 | 1/2005 |
| KR | 10-0566260 | 3/2006 |
| KR | 10-2006-0075515 | 7/2006 |

OTHER PUBLICATIONS

"Technical Report: 860MHz-960MHz Class I Radio Frequency Identification Tag Radio Frequency & Logical Communication Interface Specification Recommended Standard, Version 1.0.0", Auto-ID Center, Nov. 14, 2002.

"Information Technology—Radio Frequency Identification for Item Management—Part 6: Parameters for Air Interface Communications at 860 MHz to 960 MHz", ISO/IEC 18000-6:2004(E), Aug. 15, 2004.

"Information Technology—Radio Frequency Identification for Item Management—Part 7: Parameters for Active Air Interface Communications at 433MHz", ISO/IEC 18000-7:2004(E), Aug. 15, 2004.

* cited by examiner

APPARATUS AND METHOD FOR INTEGRATED READER AND TAG

This application is based on and hereby claims priority to International Application No. PCT/KR2007/003601 filed on Jun. 26, 2007, and Korean Application No. 10-2007-0074680, filed Jul. 25, 2007, and Korean Application No. 10-2006-0070417, filed Jul. 26, 2006, the contents of all of which are hereby incorporated by reference.

TECHNICAL FIELD

The present invention relates to a reader/tag integrated radio frequency identification (RFID) apparatus and a method thereof; and, more particularly, to a reader/tag integrated RFID apparatus that operates as a reader or a tag without collision and a method thereof.

This work was partly supported by the Information Technology (IT) research and development program of the Korean Ministry of Information and Communication (MIC) and/or the Korean Institute for Information Technology Advancement (IITA) [2006-S-023-01, "Development of Advanced RFID System Technology"]

BACKGROUND ART

Radio frequency identification (RFID) is a technology that recognizes, traces, and manages objects or animals with a tag attached by obtaining or recording information from the tag having unique identification information in contactless manner using a radio frequency (RF).

In general, the RFID includes a RFID tag including unique identification information and attached at an object and an animal and a RFID reader for receiving information from the tag or writing information to the tag. The RFID is classified into a mutual induction type and an electromagnetic type according to a communication method between the reader and a tag, or into a long wave type, a medium wave type, a short wave type, and a microwave type.

A RF unit having a reader, often referred as an interrogator, is a portable unit or a stationary unit for receiving a signal from the RFID tag and decodes the received signal.

When a plurality of RFID tags are in the tag-recognizable coverage of the RFID reader, a plurality of a RFID tags in the tag-recognizable coverage simultaneously respond to the signal of the RFID reader, thereby arising a collision problem.

Therefore, an anti-collision algorithm is required to identify a plurality of tags. The anti-collision algorithm is generally divided into a tree-based deterministic algorithm and a slot-aloha based probabilistic algorithm.

Recently, a UHF band has been recognized as a band suitable for the distribution industry. In order to satisfy the strong demand of the RFID market, the related standard has been rapidly progressed compared to other frequency bands. Among the introduced standards, ISO/IEC 18000-6 A, ISO/IEC 18000-6 C, 18000-7, and EPC C1 use the slot aloha based anti-collision algorithm.

In the slot aloha based anti-collision algorithm, a transmission time is divided into a plurality of time slots, and each tag selects one of time slots and transmits data using the selected time slot. In a general RFID system, a reader transmits a command with the number of slots as a parameter to each of tags in the coverage thereof. Then, each of the tags generates a random number, selects a slot, loads the information to transmit into the corresponding slot, and responds to the reader. Although a slot having one information is recognized by a reader, a slot having a plurality of information, a slot with collision generated, is not recognized by a reader. Herein, the slot having one information denotes a slot occupied by one tag or is referred as an identification slot. The slot having a plurality of information is a slot occupied by a plurality of tags. Due to the collision, the tags must retransmit the information in the next round or the next frame.

In order to effectively identify tags, the number of slots is set to have higher system efficiency, that is, a higher rate of identification slots in entire slots. Excessively large number of slots compared to the number of tags causes slots to be wasted, and excessively small number of slots compared to the number of tags increases a collision generation rate among tags. That is, the number of tags in the same coverage and the set number of slots decide the system efficiency.

Conventionally, a RFID tag and a RFID reader are independent devices. There is no tag/reader integrated RFID apparatus and a method thereof introduced lately.

Therefore, there is a demand for developing a tag/reader integrated RFID apparatus that performs both of a tag function and a reader function and a method of controlling a tag and a reader in the tag/reader integrated RFID apparatus without collision.

DISCLOSURE

Technical Problem

An embodiment of the present invention is directed to providing a tag/reader integrated RFID apparatus for performing both of a tag function and a reader function and a method for operating the same.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a reader-tag integrated radio frequency identification (RFID) apparatus including: a tag unit for communicating with an external reader, and transmitting a response signal and data corresponding to a signal transmitted from the external reader to the external reader; a reader unit for selecting a channel between other reader and the reader-tag integrated RFID apparatus with a different delay time, and communicating with an external tag using a random value to minimize collision; and a controlling unit for selectively activating one of the tag unit and the reader unit if it necessary.

In accordance with another aspect of the present invention, there is provided a method for controlling a reader-tag integrated radio frequency identification (REID) apparatus, including the steps of: communicating with an external reader and transmitting a response signal and data corresponding to a signal transmitted from the external reader to the external reader; communicating with an external tag by selecting a channel between other reader and the reader-tag integrated RFID with a different delay time and using a random value to minimize collision; and selectively performing the communicating with the external reader and the communicating with the external tag if it necessary.

Advantageous Effects

According to a tag/reader integrated RFID apparatus and a method for controlling the same according to an embodiment of the present invention, a RFID system is reduced in a size and a portability thereof can increase.

BEST MODE FOR THE INVENTION

The advantages, features and aspects of the invention will become apparent from the following description of the embodiments with reference to the accompanying drawings, which is set forth hereinafter.

Figure 1:
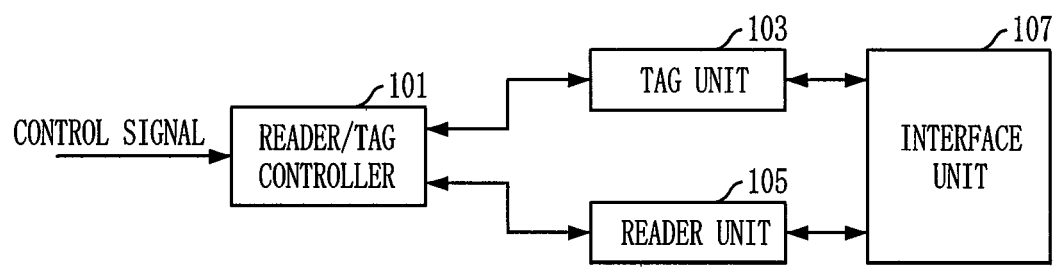
FIG. 1 is a block diagram illustrating a reader/tag integrated RFID apparatus in accordance with an embodiment of the present invention.

FIG. 1 is a block diagram illustrating a reader/tag integrated RFID apparatus in accordance with an embodiment of the present invention.

Referring to FIG. 1, the reader/tag integrated RFID apparatus (hereinafter, RFID apparatus) according to an embodiment of the present invention includes a reader/tag controller 101, a tag unit 103, a reader unit 105, and an interface unit 107.

When the RFID apparatus according to the present embodiment operates as a tag, the reader/tag controller 101 receives a control signal and transmits a control signal and an operating signal to the tag unit 103. The tag unit 103 operates as a tag using the control signal and the operating signal transmitted from the reader/tag controller 101. The tag unit 103 will be described in detail with reference to FIG. 4 in later.

When the RFID apparatus according to the present embodiment operates as a reader, the reader/tag controller 101 receives a control signal and transmits the control signal and the operating signal to the reader unit 105.

The reader 105 operates as a reader using the control signal and the operating signal transmitted from the reader/tag controller 101. The reader 105 will be described in detail with reference to FIGS. 5 and 6 in later.

Figure 2:
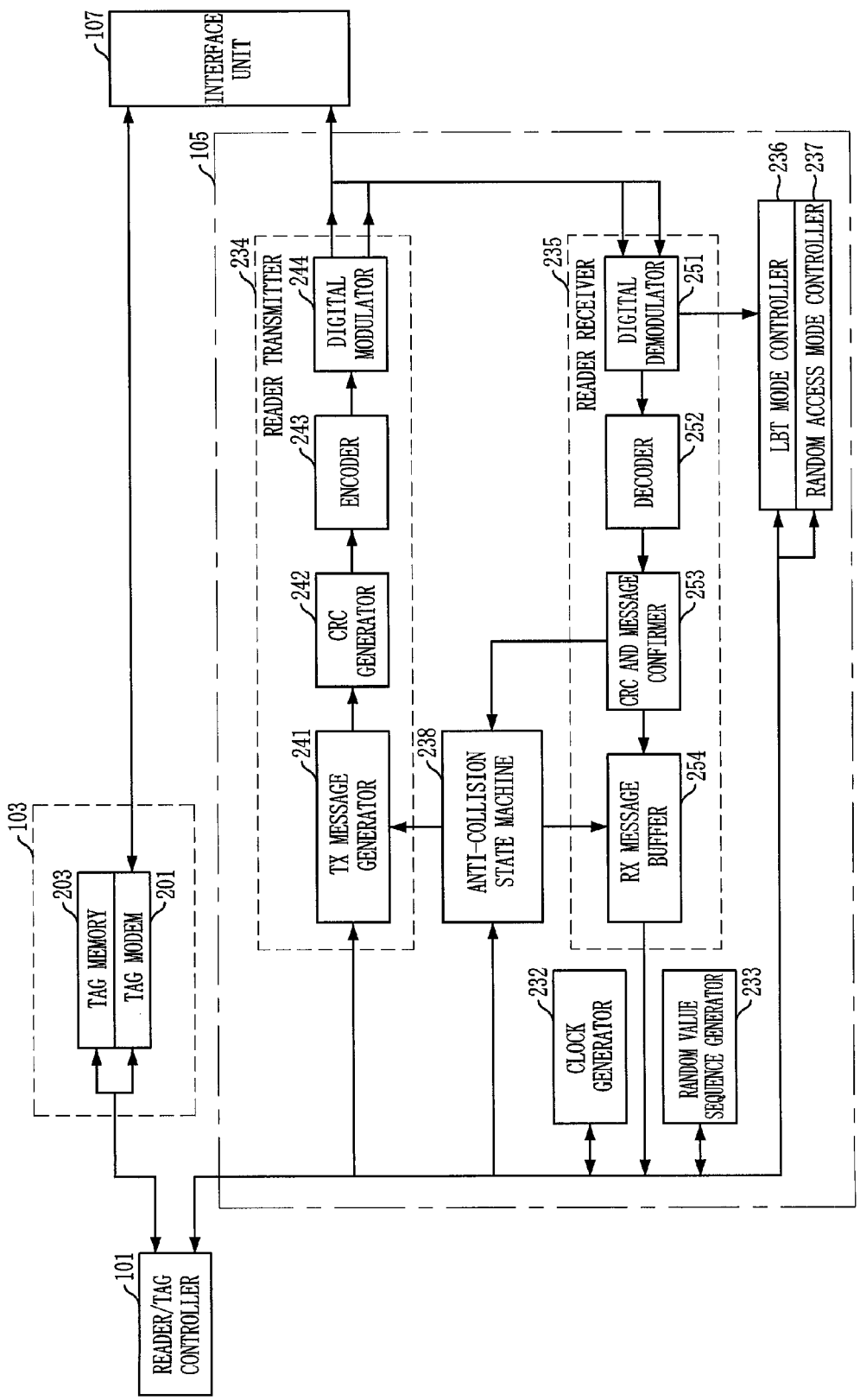
FIG. 2 is a block diagram depicting a reader/tag integrated RFID apparatus in detail in accordance with an embodiment of the present invention.

FIG. 2 is a block diagram depicting a reader/tag integrated RFID apparatus in detail in accordance with an embodiment of the present invention.

Referring FIG. 2, the tag unit 103 includes a tag modulation/demodulation (MODEM) 201 for recognizing a command by demodulating a reader signal transmitted from the outside and modulating and demodulating a tag ID and data corresponding to the command, and a tag memory 203 for reading stored tag ID and data and providing the read tag ID and data to the tag MODEM 201 or writing external data in a memory included in a tag memory. The reader 105 includes a reader transmitter 234 for transmitting a reader command for a reader-to-tag communication, a reader receiver 235 for receiving data from the tag, an anti-collision state machine 238 for controlling collision among a plurality of, which is generated in the reader-to-tag communication, a LBT mode controller 236 for controlling according to a listen before talk (LBT) mode, a random access mode controller 237 for controlling according to a random access mode, and a random value sequence generator 233 for generating a random value sequence and providing the random value sequence to the reader/tag controller 101.

The controller 101 receives a control signal from a host or a middle ware, for example, a mobile phone, decides whether the RFID apparatus according to the present embodiment operates as a reader or a tag, and actives one of the tag unit 103 and the reader unit 105 according to the decision.

When the RFID apparatus according to the present embodiment operates as a tag, the tag unit 103 demodulates an external reader signal received from the interface unit 107 and reports the demodulated external reader signal to the reader/tag controller 101.

The reader/tag controller 101 transmits a control signal to the tag unit 103 according to the reported external reader signal. The tag unit 103 generates data corresponding to the demodulated external reader signal according to the control signal of the reader/tag controller 101 and modulates the generated data. The tag unit 103 transmits the modulated data to the interface unit 107.

The tag memory 203 performs a control function for reading data stored in the tag memory 203 and a control function for enabling an external reader to write data to the tag memory 203 according to a control signal of the reader/tag controller 101. That is, the tag memory 203 performs the control functions when an external reader wants to write data on the tag memory 203 or to change an existing tag ID. The data controlled by the tag memory 203 is used in the tag MODEM 201.

When the RFID apparatus operates as a reader, the random value sequence generator 233 generates a random value sequence in a range of 0 to $2^R-1$ and provides the generated random value sequence to the reader/tag controller 101 in order to make each of readers to select a channel with different delay times according to a R slot counter value set by the reader/tag controller 101. The R slot counter value is set by the reader/tag controller 101. The reader/tag controller 101 monitors a communication state with a current tag, sets the R counter value greater if the number of readers increases in a recognizable area, and sets the R counter value smaller if the number of readers decreases in a recognizable area. In general, a RF power is sustained as OFF before a channel is selected by a RFID reader. When a large value is set as the R slot counter value, the OFF state of the RF power is sustained longer by a channel access algorithm. Therefore, the collision among a plurality of readers may be reduced. When a small value is set as the R slot counter value, a waiting time of a reader for selecting a channel becomes shortened. In the present embodiment, the reader/tag controller 101 adaptively sets the R slot counter value according to the current state, thereby minimizing the collision among readers. Meanwhile, the function of the random value sequence generator 233 may be included in the reader/tag controller 101.

The reader/tag controller 101 controls various registers in a RFID reader, and address pins used for controlling the registers are defined according to the number of internal registers. Also, the reader/tag controller 101 may use a chip selection signal, a read signal, a write signal, and an output enable signal for controlling the registers. The reader/tag controller 101 controls each of the blocks in the reader unit 105 and uses a synchronous interface scheme for CUP clocks as an interface among blocks. The reader/tag controller 101 can select one of a LBT mode and a random access module for communicating with tag in the present embodiment. The reader/tag controller 101 sets LET parameters in the LET mode controller 236 or sets random access parameters in the random access mode controller 237 according to the selected communication mode.

The reader/tag controller 101 sets the R slot counter value of the random value sequence generator 233, selects one of random values among the random value sequence generated by the random value sequence generator 233, and waits until the selected random value becomes 0. The reader/tag controller 101 transfers a signal for starting occupying a channel to the LBT mode controller 236 or the random access mode controller 237 when the selected random value becomes 0. The reader/tag controller 101 sets reader commands necessary for communicating with a tag at a TX message generator 241 and receives tag information including EPC obtained through the communication with a tag from a RX message buffer 254.

The reader transmitter includes a TX message generator 241, a CRC generator 242, an encoder 243, a digital modulator 244.

The TX message generator 241 generates a command message to be transmitted to a tag according to a command from the anti-collision state machine 23. The generated messages includes commands used for an 'Inventory' process such as 'Query', 'QueryAdjust', 'QueryRep', and 'Ack', and commands used for an 'Access' process such as 'Req_RN', 'Read', and 'Write'. The CRC generator 242 generates a cyclic redundancy check (CRC) for a frame of the generated TX massage and adds the generated CRC into the TX message. The operation for generating and adding CRC may be performed in the TX message generator 241.

The encoder 243 encodes message data transferred from the TX message generator and the CRC generator. In case of employing international standard ISO/IEC 18000-6C rule, the encoder 243 performs a pulse-internal encoding (PIE). The digital modulator 244 receives the encoded data from the encoder and generates and shapes a waveform for DBS-ASK or PR-ASK. The digital modulator 244 may include a digital or an analogue type pulse shaping filter for shaping the waveform of the encoded data according to the international standard 18000-6C rule. The pulse shaping filter restricts unnecessary bands in a RF end and formulates an envelope for communication with a tag to follow a transmission output spectrum mask introduced in the 18000-6C rule. The signal outputted from the digital modulator 244 is inputted to a digital to analog converter (DAC: not shown). The DAC converts the digital modulated signal to the analog signal. The analog signal is transmitted to a tag by frequency-up conversion to a UHF band and power amplification.

The reader receiver 235 includes a digital demodulator 251, a decoder 252, a CRC and message confirmer 253, and a RX message buffer 254.

The digital demodulator 251 receives a signal, which is frequency-down converted and analog-to-digital converted after it is received through a reader antenna, and performs a digital modulation such as ASK. The digital demodulator 251 measures a received signal strength indication (RSSI) of a received signal and transmits the measured RSSI to the LBT mode controller 236 in the present embodiment.

The decoder 252 receives a demodulated signal from the digital demodulator and decodes the demodulated signal based on a frequency modulation 0 (FM0) decoding scheme or a miller sub-carrier decoding scheme.

The CRC and message confirmer 253 calculates a CRC for the decoded data from the decoder 252, inspects the CRC whether the CRC has an error or not, analyzes a received message, and reports a responding state of a tag and a CRC error to the anti-collision state machine 238. In the present embodiment, the load of the reader/tag controller 101 is reduced by calculating and inspecting a CRC of the received data in the CRC and message confirmer 253.

The RX message buffer 254 buffers RX message data received from the CRC and message confirmer and transfers buffered tag data (EPC or user specific data) to the reader/tag controller 101 according to the command of the anti-collision state machine 238.

The anti-collision state machine 238 controls an reader operation for reader-to-tag communication according to the command of the reader/tag controller 101. That is, the anti-collision state machine 238 receives a command for starting communication with a tag from the reader controller 101 and controls the TX message generator 241 to generate a reader command. Also, the anti-collision state machine 238 informs the reader/tag controller 101 of the receiving state information of the tag information reported from the CRC and message confirmer 253 and decides a reader command to transmit to the tag according to the responding state of a tag that is reported from the CRC and message confirmer 253. The reader receiver 235 controls the RX message buffer 254 to transfer obtained tag information to the reader/tag controller 101 when the reader receiver 235 successfully obtains tag information including EPC.

The anti-collision state machine 238 controls collisions among a plurality of tag, which are generated in the reader-to-tag communication. The anti-collision denotes a procedure of a reader for obtaining tag information by identifying one of a plurality of tags. In the anti-collision, a plurality of reader commands including 'Select', 'Query', and 'QueryRep' may be used.

The LBT mode controller 236 receives parameters from the reader/tag controller 101 for performing a Listen Before Talk (LBT) mode, and performs channel access in a LBT mode. In more detail, the LBT mode controller 236 generates a frequency channel sequence for searching a channel used for communicating with a tag and receives the received signal strength indicator (RSSI) of a selected channel, which is selected according to the generated frequency channel sequence, from the digital demodulator 251. The LBT mode controller 236 determines whether a channel is available or not by comparing the received RSSI with a predetermined threshold value and selects a channel for communicating with a tag. After selecting a channel, the LBT mode controller 236 turns on the transmission power of the RP unit and informs the reader/tag controller 101 or the anti-collision state machine 238 of the selected channel, thereby stating communicating with a tag.

The random access mode controller 237 performs a channel access operation by receiving parameters from the reader controller 101. That is, the random access mode controller 237 turns on the RF unit in response to the control of the reader/tag controller 101, sets PLL as a predetermined value, and occupies one channel. Then, the random access mode controller 237 informs the reader/tag controller 101 or the anti-collision state machine 238 that a channel is occupied thereby enabling the reader unit to communicate with a tag The LBT mode controller 236 and the random access mode controller 237 can share a PLL controller (not shown) that generates control parameters PLL_CLK, PLL_DATA, and PLL_ENABLE for the PLL of a RF unit (not shown). That is, the LBT mode controller 236 and the random access mode controller 237 may perform function of uniformly distributed random number generation by sharing a R, N, F counter table (PLL R, N, F, Counter Table) for PLL control.

The clock generator 232 generates and provides a clock and control signal used in the RFID reader. The clock generator 232 includes a timer for the real-time operation of the reader/tag controller 101, thereby reducing the load of the reader controller 101.

The LBT or the random channel access scheme will be described in more detail with reference to FIGS. 5 and 6 in later.

The interface unit 107 operates as an interface for controlling external devices such as a RF unit, an analog to digital converter (ADC), and a digital-to-analog converter (DAC).

Figure 3:
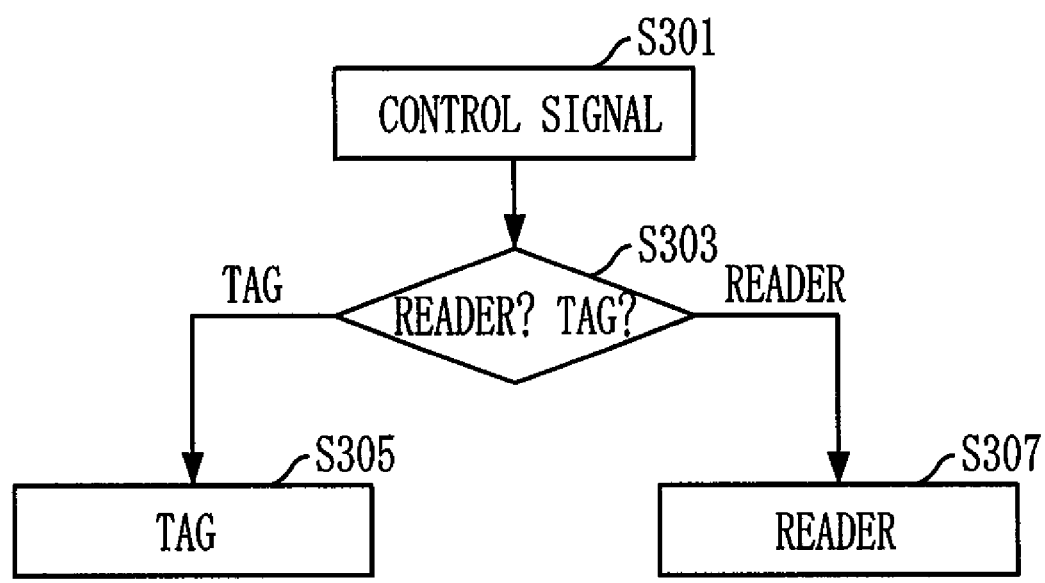
FIG. 3 is a flowchart illustrating a method for operating a reader/tag integrated RFID apparatus in accordance with an embodiment of the present invention.

FIG. 3 is a flowchart illustrating a method for operating a reader/tag integrated RFID apparatus in accordance with an embodiment of the present invention.

As shown in FIG. 3, the RFID apparatus according to the present embodiment receives a control signal from a host or a middleware at step S301 and decides whether the RFID apparatus is used as a tag or a reader at step S303.

If the RFID apparatus is decided to operate as a tag at step S305, the tag operation of the RFID apparatus according to the present embodiment will be described with reference to FIG. 4.

If the RFID apparatus is decided to operate as a reader at step S305, the reader operation of the RFID apparatus according to the present embodiment will be described with reference to FIGS. 5 to 7.

Figure 4:
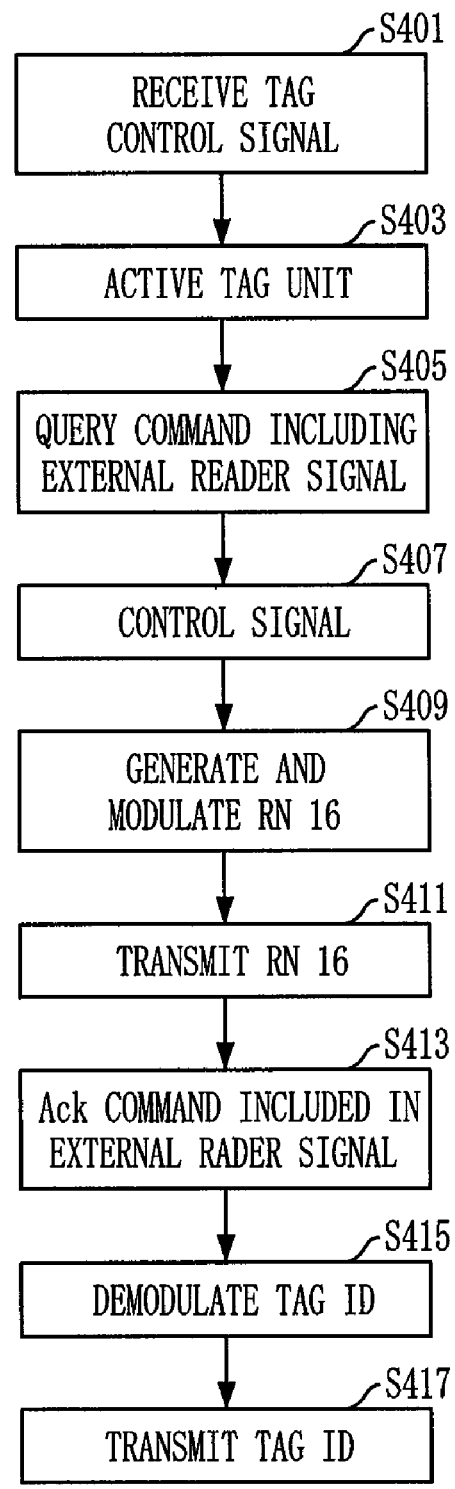
FIG. 4 is a flowchart illustrating a method for operating a reader/tag integrated RFID apparatus as a tag in accordance with an embodiment of the present invention.

FIG. 4 is a flowchart of a method for operating a reader/tag integrated RFID apparatus in accordance with an embodiment of the present invention. That is, the international standard ISO/IEC 18000-6C (Gen2) is used for operating the reader/tag integrated RFID apparatus according to the present embodiment.

The international standard ISO/IEC 18000-6C relates an air protocol for communication between a tag and a reader using UHF band (900 MHz).

At step S401, the tag/reader controller 101 receives a control signal from a host or a middleware to operate as a tag.

At step S403, the tag/reader controller 101 activates a tag unit 103.

At step S405, the tag MODEM 201 demodulates an external reader signal from the interface unit 107, determines a command transmitted through the signal from the external reader, and reports the detected command to the tag/reader controller 101. That is, the tag MODEM 201 demodulates an external reader signal and detects a command included in the demodulated signal. If the detected command is a Query command, the tag MODEM 201 reports the Query Command to the reader/tag controller 101.

At step S407, the reader/tag controller 101 transmits a control signal to the tag MODEM 201. Herein, the reader/tag controller 101 manages the tag state by setting the current tag state as Arbitrate.

At step S409, the tag MODEL 201 generates and modulates a 16-bit random value (RN16) packet for the Query Command in response to the control signal of the reader/tag controller 201.

At step S411, the tag MODEM 201 transmits the modulated RN16 packet to the interface 107.

Then, an external reader demodulates the modulated RN16 packet from the tag MODEM 201, generates an Ack command, and transmits a signal having the Ack command to the tag MODEM 201. The tag MODEM 201 demodulates the external reader signal having the Ack command transmitted from the interface unit 107, detects a command included in the external reader signal, and reports the detected command to the reader/tag controller 101 at step S413. For example, since the demodulated command is the Ack command, the tag MODEM 201 reports the Ack command information to the tag/reader controller 101.

At step S415, the reader/tag controller 101 controls the tag MODEM 201 to modulate and transmit tag ID data corresponding to the Ack command. That is, since the tag ID is stored in a unique item ID (UII) of the tag memory 203, the reader/tag controller 101 controls the tag memory 203 to enable the tag MODEM 201 to module a tag ID stored in the UII memory in a transmission signal formation. The current tag state is managed by setting it as "Reply".

At step S417, the tag MODEM 201 modulates a tag ID from the UII memory and transmits the modulated tag ID to the interface unit 107.

Figure 5:
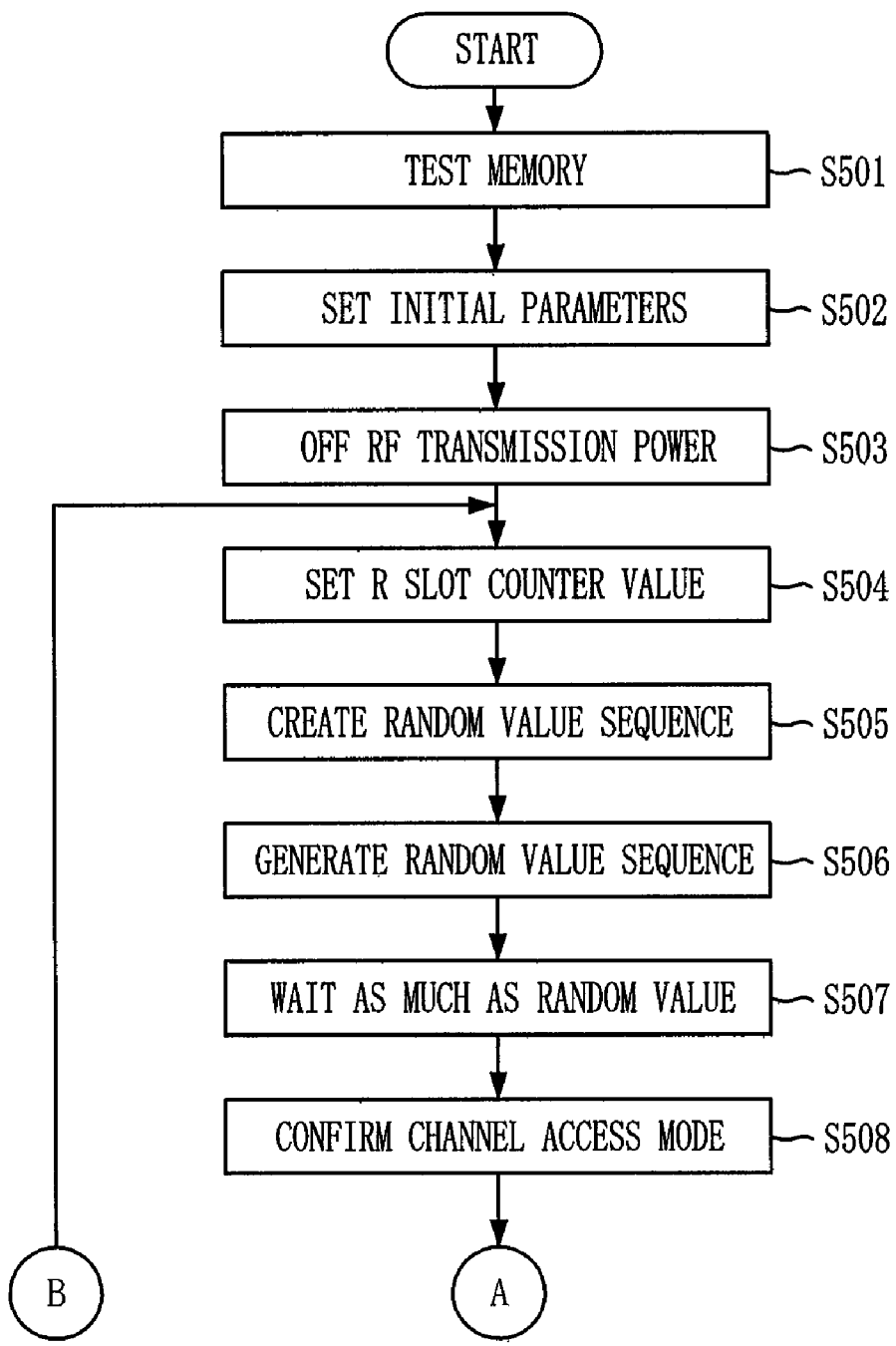
FIG. 5 is a flowchart illustrating a method for operating a reader/tag integrated RFID apparatus as a reader in accordance with an embodiment of the present invention.
Figure 6:
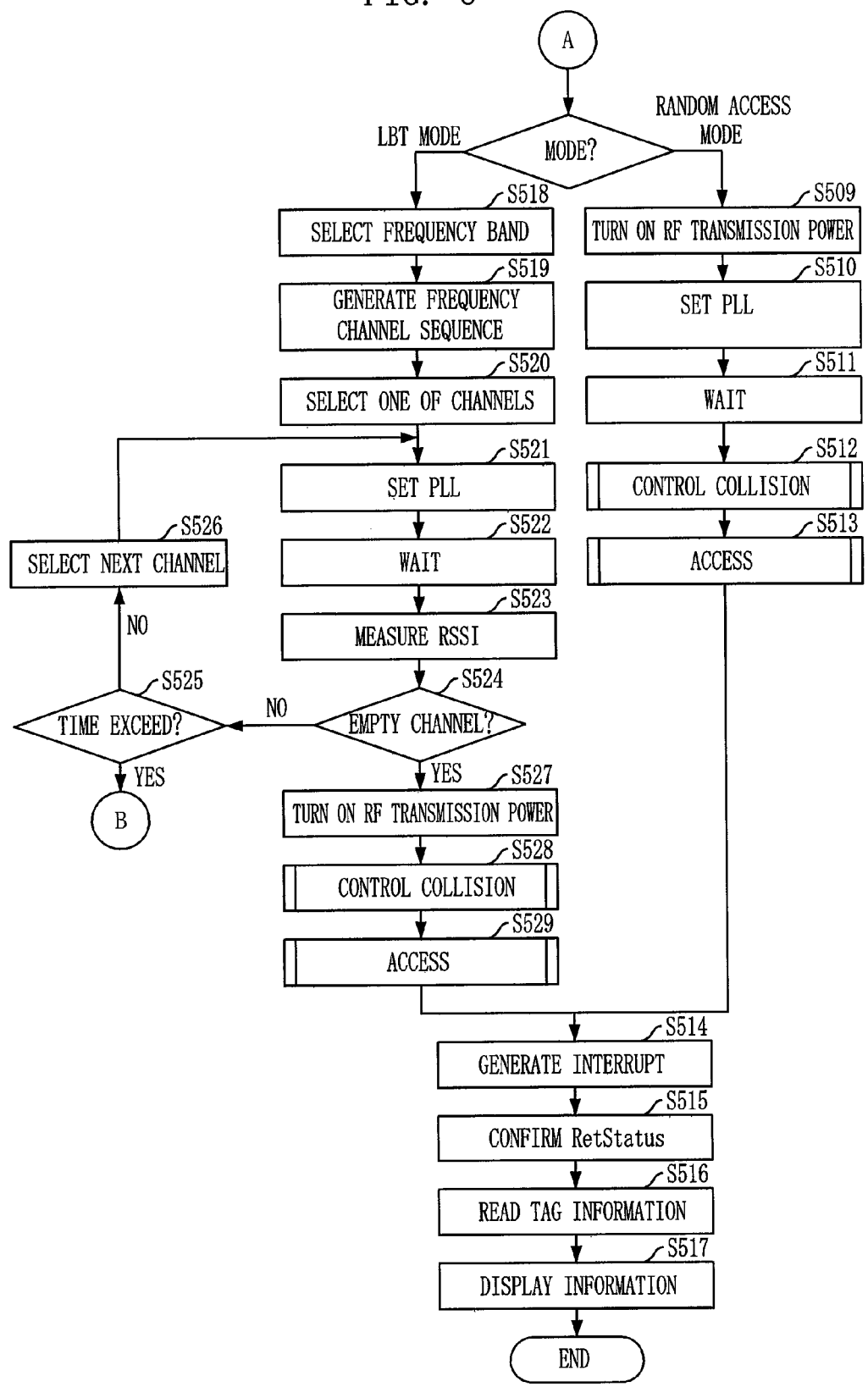
FIG. 6 is a flowchart of a method for operating a reader/tag integrated RFID apparatus in accordance with an embodiment of the present invention.

FIGS. 5 and 6 are flowcharts illustrating a method for operating a reader/tag integrated RFID apparatus as a reader in accordance with an embodiment of the present invention.

In the method for operating a reader/tag integrated RFID apparatus according to the present embodiment, an operator is allowed to select one of the LBT mode and the random access mode according to a reader environment. For example, a random access mode is selected in the present embodiment if the number of readers is comparatively small, such as a mobile RFID reader environment. Therefore, the collision among the readers can be minimized.

As shown in FIGS. 5 and 6, the method for operating a reader/tag integrated RFID apparatus as a reader according to the present embodiment includes an initial procedure S501 and S502 for testing a memory and setting commands and basic parameters, a random waiting procedure S503 to S507 for generating random values for readers to select a channel with different delay times, selecting one of the generated random numbers, and waiting as long as a delay time corresponding to the selected random value, a channel occupying procedure S509 to S511 and S518 to S527 for occupying a channel according to a set channel access mode, a tag information obtaining procedure S512, S513, S528, and S529 for obtaining tag information through anti-collision through the occupied channel or obtaining information from a tag through accessing, and an information processing procedure S514 to S517 for processing the obtained tag information.

At step S501, the reader controller 101 inspects a reader to determine whether the reader is working correctly or not by performing the initial test process of a reader including a memory. The reader controller 101 transmits an error message to a host if the reader controller 101 determines that the reader malfunctions as the result of the initial test.

If the reader controller 101 determines that the reader is working correctly as the result of the initial test, the reader controller 101 initializes various parameters necessary for a reader operation such as a channel access operation and an anti-collision operation for the small number of tags or allocates related values at step S502. The reader controller 101 sets the parameters according to a selected frequency occupying scheme. Such a frequency occupying scheme may be selected by an operator or an external device, or by the reader controller 101. The number of readers in a corresponding recognizable area and the reader environment may be considered to select the frequency occupying scheme.

In order to perform a channel access operation in a LBT mode, it is required to set a frequency band to use, a maximum search time for searching an empty channel, a maximum channel occupying time (Talk time), and a received signal strength indicator (RSSI) threshold for determining whether a channel is available or not.

Among them, the maximum channel occupying time (Talk time) denotes a maximum time for performing communication between a reader and a tag through anti-collision and access, and a reader performs a tag identifying process for the maximum channel occupying time. In the LBT mode, a reader communicates with a tag by occupying one channel for the maximum channel occupying time. Hence, a reader turns off a RF transmission power for minimizing interfering with the other readers after each of readers completely identifies corresponding tags in an environment where a plurality of readers identify the small number of tags. Therefore, the maximum channel occupying time may be set by an operator to be suitable to a dense RFID operating environment.

The maximum search time (MAX listen time) denotes a maximum time for searching an empty channel after turning off the RF transmission power.

After parameters for a channel access mode are set as described above, the reader controller 101 sets reader commands necessary for communicating with a tag in the TX message generator 241.

After completing the initial procedure of the reader as described above, the reader controller 101 instructs the LBT mode controller 236 or the random access mode controller 237 to turn off the RF transmission power at step S503. Then, the reader controller 101 sets an R slot counter value that is defined according to the reader environment in an identification area and the set channel access mode at step S504. The R is an internal parameter used for a reader to access a channel. Each of readers selects a channel with different delay times according to the R slot counter value. That is, the random value sequence generator loads a random seed value and generates a random value sequence in a range of 0 to $2^R-1$ according to the R slot counter value set by the reader controller 101 at step S505. The random value sequence generator changes a random seed value whenever a related algorithm is performed not to generate the same random value sequence. At step S506, the reader controller 101 selects one of the random value sequences in the range of 0 to $2^R-1$.

The reader controller 101 waits as much as the selected random value. That is, the reader controller 101 waits until the selected random value becomes 0 by discounting the selected random value at step S507. For example, the reader controller waits for about a time T msec and decreases the selected random value by 1 if the selected random value is not 0. The reader controller 101 repeatedly performs the process of decreasing the selected random value by one and confirms a preset channel access mode at step S508 if the selected random value becomes 0.

If a preset channel access mode is a random access mode, the reader controller 101 instructs the random access mode controller 237 to occupy a channel. Accordingly, the random access mode controller 237 turns on the RF transmitter and sets a PLL frequency corresponding to the corresponding channel at steps S509 and S510. The random access mode controller 237 can occupy a channel by using one of frequency channels which are previously defined or by selecting one of channel frequency sequences set by an operator. At step S511, the random access mode controller 237 also waits for a predetermined time, for example, about 1.5 msec, for securing a time to set a PLL value after setting a PLL frequency. If one channel is occupied as described above, the random access mode controller 237 reports the channel occupying fact to the reader controller 101 and the anti-collision state machine. According to the channel occupying report, the anti-collision step S512 and the access step S513 are performed. The anti-collision step S512 and the access step S513 will be described in detail with reference to FIGS. 7 and 8.

At step S514, the anti-collision state machine 238 generates an interrupt to the reader controller 101 if information is obtained from a tag. The reader controller 101 reports the interrupt failure to a host if the interrupt is not generated.

The anti-collision state machine reports the state information (RetStatus) of received information to the reader controller. The state information includes OK, NO_TAG, and CRC_ERR. OK means a state of normally processing data from a tag, NO_TAG denotes a state of no response from a tag, and CRC_ERR is a state of occurring error after CRC test.

The reader controller confirms the state information (RetStatus) at step S515. If the state information is OK, the reader controller reads tag information because it means the tag data is normally processed. Then, the reader controller reports the read tag information to a host or a middleware at step S516. According to the report, the tag information is displayed at step S517.

The reader controller 101 increases a failure counter value nFail, which denotes the number of failures, by one if the state information (RetStatus) is not OK, and compares the failure counter value with a maximum value N that is previously defined. If the failure counter value nFail is smaller than the maximum value N, the anti-collision step S512 and S528 are repeatedly performed. However, if the failure counter value nFail is larger than or equal to the maximum value N, the step S504 for generating a random value sequence is performed again by increasing a R slot counter value as much as a weight dR. In the present embodiment, a current communication state of a tag is monitored, and the R slot counter value is adaptively controlled when the number of readers increases. Therefore, the collisions among readers are reduced.

If the channel access mode is a LBT mode, the reader controller 101 sets an R slot counter value larger if many readers is in the same area. As the R slot counter value increases, the power off time becomes lengthened, thereby minimizing collisions among readers. Also, the reader controller 101 sets the R slot counter value smaller if the small number of readers is in the same area, thereby minimizing the waiting time of the readers for selecting a channel.

At steps S501 to S508, the reader controller 101 instructs the LBT mode controller 236 to occupy a channel when the waiting time ends because the selected random value becomes 0.

At step S518, the LBT mode controller 236 selects a frequency band according to the frequency band information that is set in the initial step. At step S519, the LBT mode controller 236 generates a frequency channel index sequence through a random seed in a selected frequency band. At step S520, one channel in the generated frequency channel index sequence is selected. In order to receive the selected channel, the LBT mode controller 236 transmits a PLL control signal to a RF unit at step S521. The LBT mode controller 236 waits for a predetermined time, for example, about 1.5 msec, in order to set a PLL value for stable operation at step S522.

If the PLL value is set, the digital demodulator 251 receives a signal of a corresponding channel and measures a RSSI of the received signal. The LBT mode controller 236 receives the measured RSSI from the digital demodulator 251, and compares the received RSSI with a RSSI threshold value (LISTEN_RSSI_THRESHOLD), thereby determining whether a corresponding channel is empty or not at steps S523 and S524. The RSSI threshold value (LISTEN_RSSI_THRESHOLD) is set in the initial step. If the measured RSSI is larger than the threshold, it means that the other readers use the channel. Therefore, the next channel is selected from the frequency channel index sequence at step S526, and the RSSI is measured again by setting a PLL again. If the maximum search time (MAX_LISTEN_TIME) for searching an empty channel exceeds at step S525, the LBT mode controller reports the excess of the maximum search time (MAX_LISTEN_TIME) to the reader controller. As a result, the step S504 for setting an R slot counter value is performed again.

After searching and finding an empty channel, the LBT mode controller 236 informs the reader controller 101 or the anti-collision state machine that the current channel is empty, and transfers a control signal to turn on the transmission power of a RF unit at step S527. The RF unit that receives the control signal supplies power to a RF unit including a up-converter and a power amplifier for transmitting a reader command.

The RFID apparatus according to the present embodiment starts reader-to-tag communication (Talk) using one occupied channel by the LBT mode controller 236. The reader-to-tag communication (Talk) includes an anti-collision step S528 for obtaining EPC from a tag by controlling collision among a plurality of tags and a tag accessing step S529 for obtaining user data stored in a user memory of a tag. The reader-to-tag communication will be described with reference to FIGS. 7 and 8.

The LBT mode controller 236 includes a talk timer for managing a talk time used by the RFID apparatus according to the present embodiment for performing the reader-to-tag communication (Talk) and determines whether the talk time exceeds the maximum channel occupying time (N[sec]) set in the initial step or not.

If the talk time exceeds the maximum channel occupying time (N[sec]), the LBT mode controller 236 transfers a control signal to the anti-collision machine 238 to terminate the reader-to-tag communication (Talk). The LBT mode controller 236 turns off the transmission power of the RF unit, and informs the reader controller 101 that the transmission power is turned off, thereby performing the step S504 again.

On the contrary, if the talk time does not exceed the maximum channel occupying time (N[sec]) although the obtaining of tag information fails, the reader-to-tag communication is performed from step S528.

If the interrupt is generated, the reader controller processes the tag information at steps S514 to S517. Since the steps S514 and S517 were already described, the detail description thereof is omitted.

Figure 7:
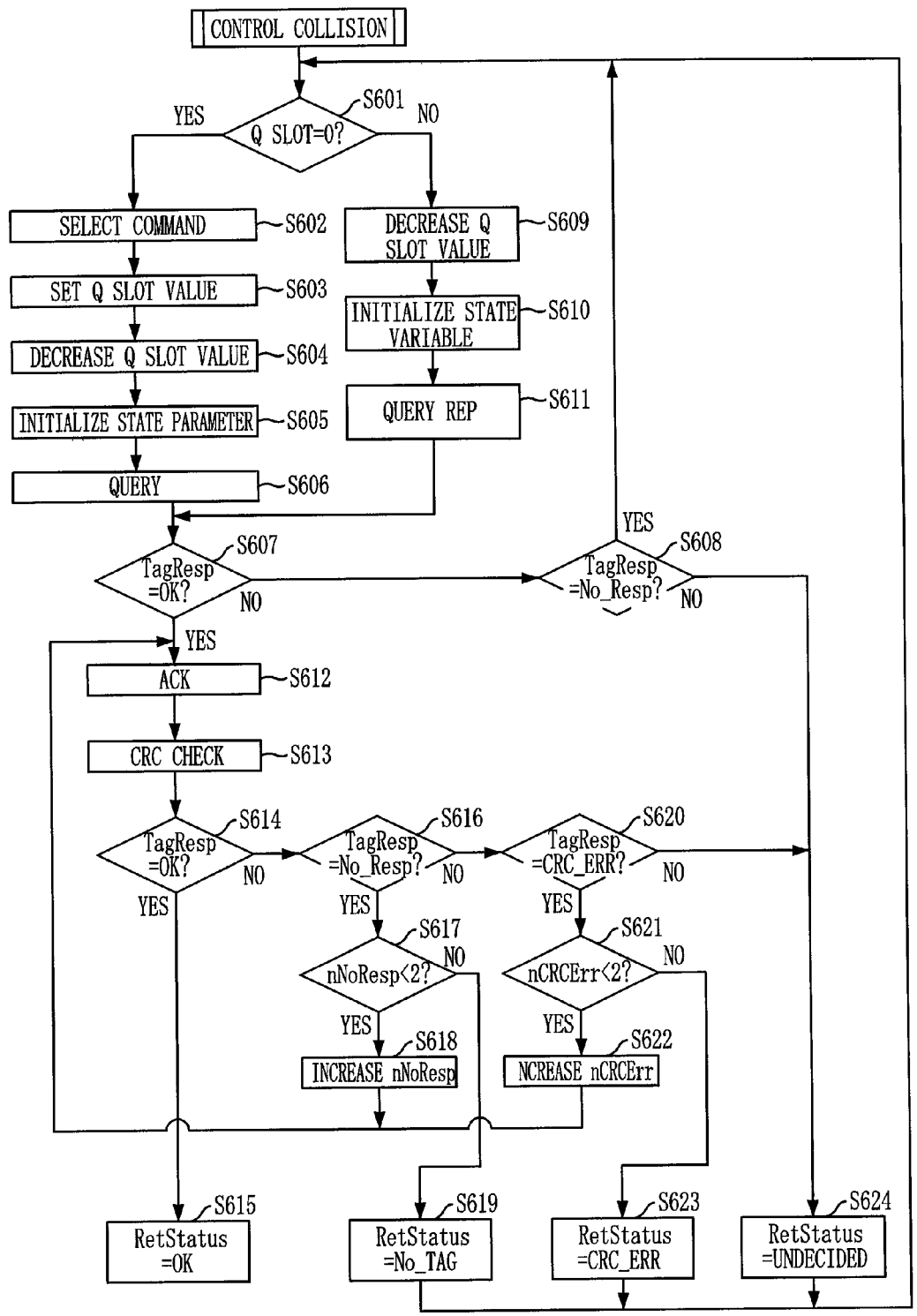
FIG. 7 is a flowchart illustrating anti-collision steps of FIG. 6.

FIG. 7 is a flowchart illustrating anti-collision steps S512 and S528 of FIG. 6.

As shown in FIG. 6, the reader-to-tag communication procedure is divided into the anti-collision steps S512 and S528, and the tag accessing steps S513 and S529. It is determined whether the tag accessing step is performed or not according to a word count parameter (nWordC) included in a read command for reading a user memory. If the word count parameter (nWordC) is 0, the RFID apparatus according to the present embodiment performs the anti-collision steps S512 and S528 only. If the word count parameter is not 0, the RFID apparatus according to the present embodiment additionally perform the tag accessing steps S513 and S529 using EPC data obtained from the anti-collision steps S512 and S528.

The reader-to-tag communication steps S512, S513, S528 and S529 are controlled by the anti-collision state machine 238. The anti-collision state machine 238 controls a reader operation for the reader-to-tag communication according to the tag signal state (TagResp) transmitted from the CRC and message confirming unit 253 and transfers the state information (RetStatus) of a signal received from a tag to the reader controller 101. The tag signal state (TagResp) includes 'TagResp==OK', 'TagResp==No_Resp', and 'TagResp==CRC_ERR'. 'TagResp==OK' denotes a state of successfully receiving tag information from a tag. 'TagResp==No_Resp' denotes a state of no response from a tag, and 'TagResp==CRC_ERR' is a state of CRC error in tag data.

As shown in FIG. 7, in the anti-collision steps S512 and S528, one of tag information (EPC data) is obtained in an order of commands Select, Query, and Ack. Also, in order to obtain remaining tag information where a slot is not 0, QueryRep command is used.

When a channel is occupied for communicating with a tag at steps S518 to S527, the anti-collision state machine 238 instructs the TX message generator to generate the Select command at steps S601 and S602 if the Q slot counter value is 0. After deciding the Q value, the anticollision state machine 238 sets the Q slot value as '$2^Q-1$' at step S603. Then, the anti-collision state machine 238 decreases the Q slot value by one at step S604 and initializes state parameters TagResp, nNoResp, and nCRCErr at step S605. In the present embodiment, 2 is selected as the Q value (Q=2) in order to read the small number of tag in a mobile RFID environment. Herein, the Q value is a value of a slot counter for a reader for searching entire slots one by one. A reader sets a predetermined defined Q value for anti-collision control among tags, and the reader searches the corresponding slot of a tag by decreasing the slot counter value by one according to the set Q value. If the slot counter value becomes 0, the reader ends to search all slots.

The anti-collision state machine 238 instructs the TX message generator 241 to generate a Query command including the Q value information, and the reader transmitter 234 starts an Inventory procedure by generating a Query command and transmitting the Query command to a tag at step S606. A response signal received from a tag for the Query command is decoded by the decoder 252 and transferred to the CRC and message confirmer 253. The CRC and message confirmer 253 reports the signal state of tag data to the anti-collision state machine 238. If no response is received from a tag (TagResp=No_Resp) at step S608, the anti-collision state machine 238 reports it to the reader controller 101, decreases the Q slot value by 1, initializes the state parameter, and instructs the TX message generator 241 to generate a QueryRep command at steps S609 to S611. If the slot value (Qslot) is 0, the step S602 is performed again.

If the tag response for the Query command at the step S606 or for the QueryRep command at step S611 is OK, the anti-collision state machine 238 instructs the TX message generator 241 to generate an Ack command at step S612. The CRC and message confirmer 253 inspects a cyclic redundancy check (CRC) of a tag response signal form the Ack command and transfers the tag response state information and the CRC inspecting result to the anti-collision state machine 238 at step S613. If no response is received from a tag at step S616, the anti-collision state machine 238 performs an operation of transmitting a positive response command (Ack command) up to twice at steps S617 and S618. If no response is continuously received from a tag, the anti-collision state machine 238 informs the reader controller 101 of no tag response (RetStatus=No_TAG) at step S619. If the CRC of data received from a tag has an error at step S620, the anti-collision state machine 238 performs an operation of transmitting a positive response command (Ack command) up to twice at steps S621 and S622. If the CRC error is continuously found, the anti-collision state machine 238 informs the reader controller 101 that the CRC has an error (RetStatus=CRC_ERR) at step S623. If the tag response for the Ack command is not successfully received, the step S601 is performed again to obtain tag information having another slot value.

If the tag response for the Ack command is successfully received, the anti-collision state machine 238 transfers the related state information (RetStatus=OK) to the reader controller 101 and generates a receiving interrupt to enable the reader controller 101 to read tag data at step S615. The anti-collision state machine 238 determines whether the tag accessing step is performed or not according to a word counter (nWordC) value that is a parameter for reading user data. The word counter value is 0 and the Q slot value is 0, the anti-collision state machine 238 terminates the anti-collision steps S512 and S528. On the contrary, if the Q slot value is not 0, the step S601 is performed again to obtain tag information having another slot value.

Figure 8:
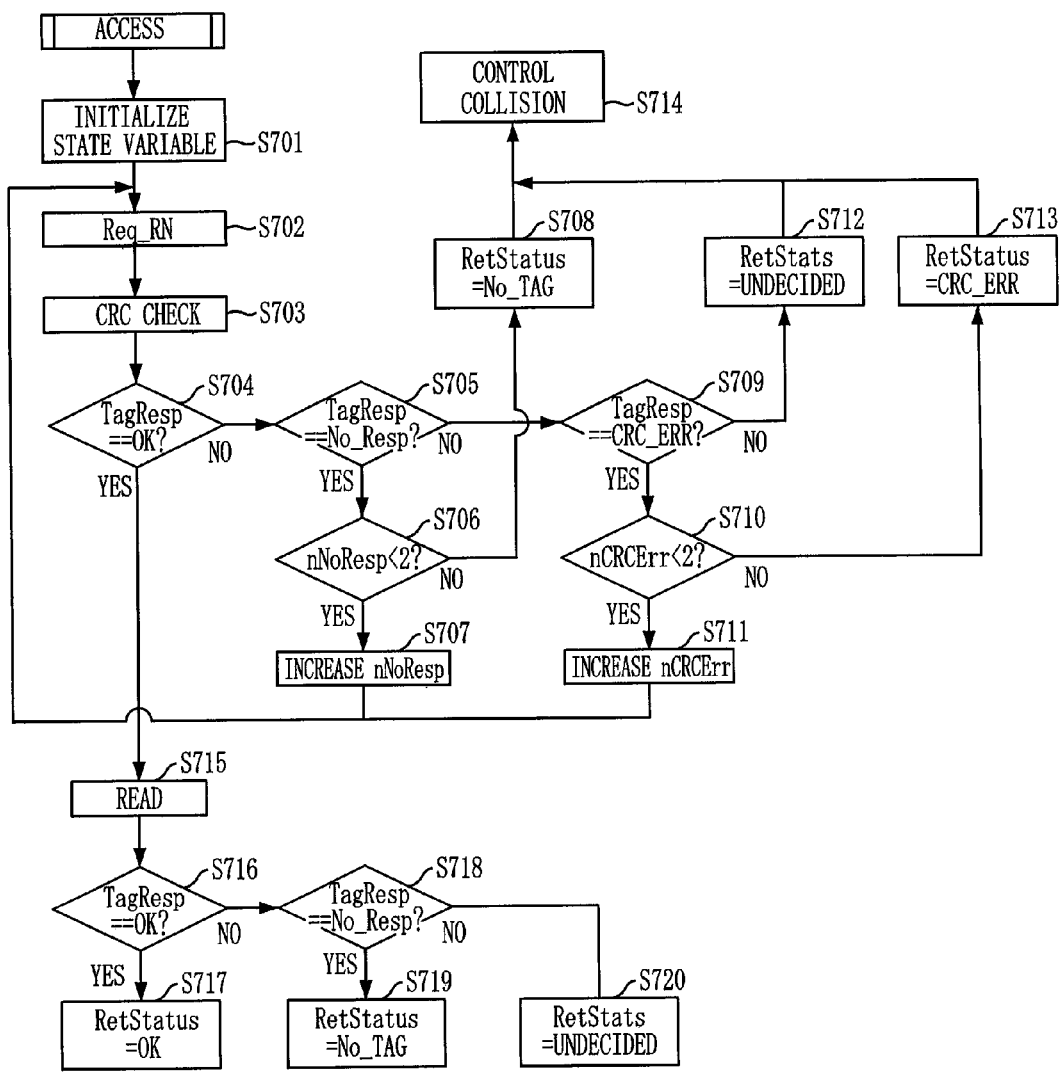
FIG. 8 is a flowchart of a tag accessing step of FIG. 6.

FIG. 8 is a flowchart of tag access steps S513 and S529 of FIG. 6.

As shown in FIG. 8, the tag accessing step is performed if the word counter value (nWordC) included in the read command is not 0, and the user-specific data of a user memory is obtained using EPC tag data obtained through the anti-collision steps S512 and S528.

The anti-collision state machine 238 initializes state parameters at step S701 and instructs the TX message generator 241 to generate a Req_RN command at step S702. A tag receiving the Req_RN command transits a current state to an Open state or a Secured state for allowing a read operation and a write operation on a tag. On the contrary, the CRC and message confirmer 253 inspects the CRC of a tag response signal for the Req_RN command at step S703 and transmits information about whether a CRC error exists or not to the anti-collision state machine 238 with the tag response state information. If no tag response is received (TagResp=No_Resp) at step S705, the anti-collision state machine 238 transmits the Req_RN command up to twice at steps S706 and S707. If no tag response is continuously received, the anti-collision state machine 238 informs the reader controller 101 that no tag response is received (RetStatus=No_TAG) at step S708. If the received tag data has a CRC error at step S709, the anti-collision state machine 238 transmits the Req_RN command up to twice at steps S710 and S711. If the CRC error is continuously generated, the anti-collision state machine 238 informs the reader controller that the received tag data has a CRC error (RetStatus=CRC_ERR) at step S713. If the tag response for the Req_RN command is not successful, the RFID apparatus according to the present embodiment performs the anti-collision steps S512 and S528 of FIG. 6 again at step S714.

Meanwhile, if the tag response for the Req_RN command is successfully received, the anti-collision state machine 238 instructs the TX message generator 241 to generate a read command to obtain user-specific data of a tag at step S715. The CRC and message confirmer 253 informs the anti-collision state machine 238 of the state of receiving a tag signal for the read command. If no tag response is received at step S718, the anti-collision state machine informs the reader controller that no tag response is received at step S719. If the tag response is successfully received for the read command at step S716, the anti-collision state machine informs the reader controller of the successful receipt of the tag response (RetStatus=OK) and generates a receiving interrupt to enable the reader controller to read user-specific data at step S717.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

While the present invention has been described with respect to certain preferred embodiments, it will be apparent to those skilled in the art that various changes and modifications may be made without departing from the spirits and scope of the invention as defined in the following claims.

Industrial Applicability

A reader/tag integrated RFID apparatus according to an embodiment of the present invention includes both of a tag function and a reader function. Therefore, the size of a related system can be reduced, and the portability thereof can be improved.

What is claimed is:

1. A reader-tag integrated radio frequency identification (RFID) apparatus, comprising:
    a tag means for communicating with an external reader, and transmitting a response signal and data corresponding to a signal transmitted from the external reader to the external reader;
    a reader means for selecting a channel for communicating between another reader and the reader-tag integrated RFID apparatus and for transmitting on the channel at a different delay time than the communicating by the tag means, and communicating with an external tag using a random value to minimize collision where a range of the random value changes responsive to a number of readers in an environment of the apparatus; and
    a controlling means for selectively activating one of the tag means and the reader means if necessary and operating in one of a listen before talk (LBT) mode and a random access mode where the mode of operating is responsive to operator selection.

2. The reader-tag integrated RFID apparatus of claim 1, wherein the reader means includes:
    a random value generator for generating a random value for selecting a channel between the other reader and the reader-tag integrated RFID apparatus with the different delay time;
    a collision controller for controlling collision among a plurality of tags and transferring a result of communicating with the external tag to the controlling means;
    a reader transmitter for generating a reader command message that is decided by the collision controller;
    a reader receiver for receiving a tag signal and reporting a state of tag response to the collision controller; and
    a channel controller for selecting a channel to use for communicating with a tag according to commands of the controlling means,
    wherein the controlling means adaptively sets a counter value for generating the random value, instructs selection of a channel for communicating with a tag if a waiting time corresponding to the random value generated from the random value generator ends, and obtains information from the tag for the selected channel.

3. The reader-tag integrated RFID apparatus of claim 2, wherein the controlling means adaptively sets the counter value according to an environment in a recognizable area of the reader-tag integrated RFID apparatus.

4. The reader-tag integrated RFID apparatus of claim 3, wherein the controlling means lengthens a waiting time for selecting a channel by setting the counter value with a comparative large value if many other readers are in an identification area of the reader-tag integrated RFID apparatus, and the controlling means shortens the waiting time for selecting a channel by setting the counter value with a comparative small value.

5. The reader-tag integrated RFID apparatus of claim 2, wherein the random value generator generates a random value sequence in a range from 0 to $2^R-1$ according to a random counter value R that is set by the controlling means.

6. The reader-tag integrated RFID apparatus of claim 5, wherein the random value generator changes a random seed value whenever an algorithm is performed not to generate the same random value sequence.

7. The reader-tag integrated RFID apparatus of claim 5, wherein the controlling means selects one of the generated random value sequence according to an environment in a reader identification area.

8. The reader-tag integrated RFID apparatus of claim 2, wherein the channel controller includes:
   a listen before talk (LBT) mode controller for performing a LBT control; and
   a random access mode controller for random access control.

9. The reader-tag integrated RFID apparatus of claim 8, wherein the controlling means selects one of the LBT mode and the random access mode as a channel occupying mode for communicating with a tag.

10. The reader-tag integrated RFID apparatus of claim 9, wherein the LBT mode controller controls a RF transmission power to be turned on if a channel selection command is received from the controlling means, and occupies a channel based on the LBT mode.

11. The reader-tag integrated RFID apparatus of claim 9, wherein the random access mode controller controls a RF transmission power to be turned on if a channel selection command is received from the controlling means, and sets a phase locked loop (PLL) for selecting a channel.

12. The reader-tag integrated RFID apparatus of claim 9, wherein the controlling means increases the counter value as much as a predetermined increment if it is failed to obtain information from the tag based on the LBT mode or the random access mode.

13. The reader-tag integrated RFID apparatus of claim 1, wherein the tag means includes:
   a tag transmitter for receiving a signal transmitted from the external reader, transferring a command of the external reader to the controlling means, and transmitting a response signal and tag data corresponding to the command to the external reader; and
   a tag memory for providing tag data to the tag transmitter or writing data inputted from an outside in response to control of the controlling means,
   wherein the controlling means controls the tag transmitter and the tag memory to transmit a response signal and data corresponding to the command to the external reader.

14. A method for controlling a reader-tag integrated radio frequency identification (RFID) apparatus, comprising:
   communicating with an external reader and transmitting a response signal and data corresponding to a signal transmitted from the external reader to the external reader;
   communicating with an external tag by selecting a channel for communicating between another reader and the reader-tag integrated RFID and transmitting on the channel at a different delay time than the communicating with the external reader and using a random value to minimize collision where a range of the random value changes responsive to a number of readers in an environment of the apparatus; and
   selectively performing the communicating with the external reader and the communicating with the external tag if necessary and operating in one of a listen before talk (LBT) mode and a random access mode where the mode of operating is responsive to operator selection.

15. The method of claim 14, wherein the selectively communicating with the external tag or the external reader comprising:
   a) selecting a random value for selecting a channel between the other reader with the different delay time;
   b) occupying a channel for communicating with a tag according to a predetermined channel occupying mode after waiting for the selected random value;
   c) communication with the tag through the occupied channel; and
   d) processing information of the tag according to a result of communicating with the tag.

16. The method of claim 15, wherein the step a) includes:
   setting a counter value for generating a random value;
   generating a random value sequence based on random seed using the set counter value; and
   selecting one random value from the generated random sequence.

17. The method of claim 16, wherein the counter value is set adaptively according to an environment in an identification area of a reader.

18. The method of claim 17, wherein the setting of the counter value includes:
   setting the counter value with a comparative large value if many readers are present in the reader identification area; and
   setting the counter value with a comparative small value if small readers are present in the reader identification area.

19. The method of claim 16, wherein in the generation of the random value sequence, the random value sequence is generated in a range of 0 to $2^R-1$ according to the set counter value R.

20. The method of claim 19, wherein the random seed in the generation of the random value sequence changes whenever an algorithm is performed not to generate the same random value sequence.

21. The method of claim 15, wherein, if the set channel occupying mode is a random access mode, the step b) includes:
   controlling a RF transmission power to be turned on after waiting as long as the selected random value; and
   setting a phase locked loop (PLL) for occupying one frequency channel.

22. The method of claim 21, wherein in the setting of the PLL, a PLL value is set corresponding to a frequency channel that is previously defined.

23. The method of claim 21, wherein in the setting of the PLL, a frequency is selected from a channel frequency sequence that is previously defined by an operator, and a PLL value is set corresponding to the selected frequency channel.

24. The method of claim 15, wherein, if the set channel occupying mode is a listen before talk (LBT) mode, the step b) includes:
   generating a frequency channel sequence after waiting as long as the selected random value;
   selecting a channel from the generated frequency channel sequence;

measuring a received signal strength indicator (RSSI) of the selected channel and determining whether the selected channel is usable or not;

selecting a next channel from the generated frequency channel sequence if the selected channel is not usable and determining whether the selected next channel is usable or not through measuring a RSSI of the selected next channel; and controlling a RF transmission power to be turned on if the selected channel is usable.

25. The method of claim 16, wherein the step c) includes the steps of:

obtaining tag information from the tag while controlling collision among a plurality of tags using the occupied channel; and obtaining user data from the tag according to the result of the controlling of the collision.

26. The method of claim 25, wherein the controlling of the collision includes the steps of:

generating a select command for obtaining tag information;

setting a Q value denoting the number of slots, confirming a tag response of a corresponding slot, and decreasing the number of slots by the set Q value;

generating a query command after initializing state parameters for response states of a tag;

decreasing the number of slots by the Q value if all of set slots are not completely searched, initializing the state parameter, and generating a query repeat command;

generating a positive response command if a response is normally received from the tag according to the query command or the query repeat command; and deciding the state parameter according to a response state of the tag by inspecting a cyclic redundancy check (CRC) of the data received from the tag.

27. The method of claim 26, wherein the deciding of the state parameter includes steps of:

setting the state parameter as 'OK' if the CRC test result is normal and the tag normally responds for the positive response command, where 'OK' denotes a state of normally processing data from the tag;

setting the state parameter as 'NO$_{13}$ TAG' if no response is received from the tag for the positive response command, where 'NO_TAG' denotes a state that the tag does not response for the positive response command; and setting the state parameter as 'CRC_ERR' if the CRC has an error, where 'CRC_ERR' denotes a state that the CRC has an error as the CRC test result.

28. The method of claim 27, wherein the deciding of the state parameter further includes steps of repeatedly generating the positive response command at predetermined times if the tag does not respond for the positive response command and setting the state parameter as 'NO_TAG" if the tag dose not response for the repeated positive response commands.

29. The method of claim 27, wherein the deciding of the state parameter further includes steps of repeatedly generating the positive response command at predetermined times if the CRC has an error and setting the state parameter as 'CRC_ERR" if the CRC has an error.

30. The method of claim 27, wherein the counter value is set by adding a predetermined increment at the step a) if the state parameter is not 'OK' as a result of communicating with the tag.

31. The method of claim 14, wherein the communicating with an external tag includes steps of:

a) recognizing a command included in a signal transmitted from an external reader;

b) transmitting a response signal or tag data corresponding to the command; and c) recording data included in a signal transmitted from the external reader.

* * * * *